US007742548B2

(12) United States Patent
Ramaswamy et al.

(10) Patent No.: US 7,742,548 B2
(45) Date of Patent: Jun. 22, 2010

(54) METHOD AND DEVICE FOR FRAME SYNCHRONIZATION AND COARSE FREQUENCY OFFSET ESTIMATION (CFE)

(75) Inventors: Shobha Ramaswamy, Bangalore (IN); Anasuya Pai Maroor, Mangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 750 days.

(21) Appl. No.: 11/671,490

(22) Filed: Feb. 6, 2007

(65) Prior Publication Data

US 2008/0186948 A1    Aug. 7, 2008

(51) Int. Cl.
*H03D 1/00* (2006.01)
(52) U.S. Cl. .................................................. 375/343
(58) Field of Classification Search ................. 375/130, 375/142, 147, 340, 341, 343, 355, 389, 346, 375/260; 370/208, 210, 330, 342, 355, 367, 370/509
See application file for complete search history.

(56) References Cited

U.S. PATENT DOCUMENTS 5,930,267 A * 7/1999 Daneshrad et al. .......... 370/509
7,095,811 B1 * 8/2006 Shikh-Bahaei et al. ...... 375/340
2003/0179838 A1 * 9/2003 Hamon ....................... 375/326
2006/0222095 A1 * 10/2006 Niu et al. .................... 375/260
2007/0280098 A1 * 12/2007 Bhatt et al. .................. 370/208

* cited by examiner

*Primary Examiner*—David C Payne
*Assistant Examiner*—Syed Haider
(74) *Attorney, Agent, or Firm*—Prakash Nama; Global IP Services, PLLC (57) ABSTRACT

A device for Frame Synchronization and coarse frequency offset estimation (CFE) and a method thereof is provided. The method may include the step of receiving a communication signal in a matched filter. The matched filter may be configured for selecting one or more blocks from the communication signal. The matched filter may be further configured for filtering the blocks to obtain an output of the matched filter. The method may also include the step of providing the output of the matched filter to a frame synchronizer and to a coarse frequency estimator. The method may include the step of obtaining substantially simultaneously a symbol boundary using the frame synchronizer and a plurality of metrics using the coarse frequency estimator. Each of the metric may be an indicative of an estimate of coarse frequency offset. The method may further include a step of selecting one of the metric from the plurality of metrics according to the symbol boundary for obtaining an estimate of the coarse frequency offset. The method further provides a step of obtaining the estimate of the coarse frequency offset by performing an inverse tangent operation on the selected metric.

32 Claims, 6 Drawing Sheets

METHOD AND DEVICE FOR FRAME SYNCHRONIZATION AND COARSE FREQUENCY OFFSET ESTIMATION (CFE)

FIELD OF THE INVENTION

This invention relates generally to a method and device for Coarse Frequency offset Estimation (CFE) and frame synchronization, more particularly the invention relates to CFE and frame synchronization for 802.11 transmissions.

BACKGROUND OF THE INVENTION

WLAN (wireless local area networks) systems are one of the popular forms of communication systems. WLAN systems are governed by 802.11 standards. As known, the standard 802.11a is the WLAN standard for 5 GHz spectrum transmissions, based on Orthogonal Frequency Division Multiplexing (OFDM). It is noted that the systems governed by the 802.11b standard for 2.4 GHz spectrum are based on Direct Sequence Spread Spectrum/Complementary Code Keying (DSSS/CCK). It is also noted that the standard 802.11g is an enhancement over the standard 802.11b operating in 2.4 GHz band. The standard 802.11g supports transmissions of both 802.11a and 802.11b frames in 2.4 GHz band giving a maximum data rate of 54 Mbps.

A communication signal communicated over a WLAN system is typically encoded in a plurality of frames, each of the frames may include a plurality of symbols. The standard 802.11b may provide a training period of 56 microseconds for short preamble mode. The training period is a time period in which the system has to detect the signal type and/or determine characteristics of the communication signal received by the system. During the training period the receiver requires to perform a number of operations, these operations may include: determining gain—Automatic Gain Control (AGC); selecting best antenna—Antenna Diversity (AD); acquiring and detecting symbol boundaries—frame synchronization; estimating and correcting Carrier Frequency Offset (CFO) and Sampling Frequency Offset (SFO); estimating channel and equalizer coefficients, etc.

Typically for a system operating according to 802.11b standard, locking AGC requires about 8-9 micro seconds, acquisition and boundary detection require about 12 microseconds, channel and rake estimation require about 15 microseconds, coarse frequency estimation requires about 11 microseconds. So, for a single antenna system, total time required for synchronization and equalization related operations is about 47 microseconds. Of the available 56 microseconds of training period, 7 microseconds is required to synchronize the descrambler. Hence, due to scarcity of time, antenna diversity and/or other operations are often compromised in respect of quality.

In a system operating according to 802.11b standard, the data bits are modulated, spreaded to form symbols and transmitted. At the receiver end, it may be required to detect the presence of valid packet and then find the symbol boundary before demodulating the data. Further it is likely, that the carrier and sampling clocks at the transmitter end and at the receiver end will not be synchronized resulting in frequency offset and accordingly, it may be required to determine and correct the frequency error.

The spreading code used during the training period is 11-chip Barker sequence in 802.11b systems. In the subsequent discussion, for the purpose of explanation, Barker correlated signals are discussed.

Figure 1:
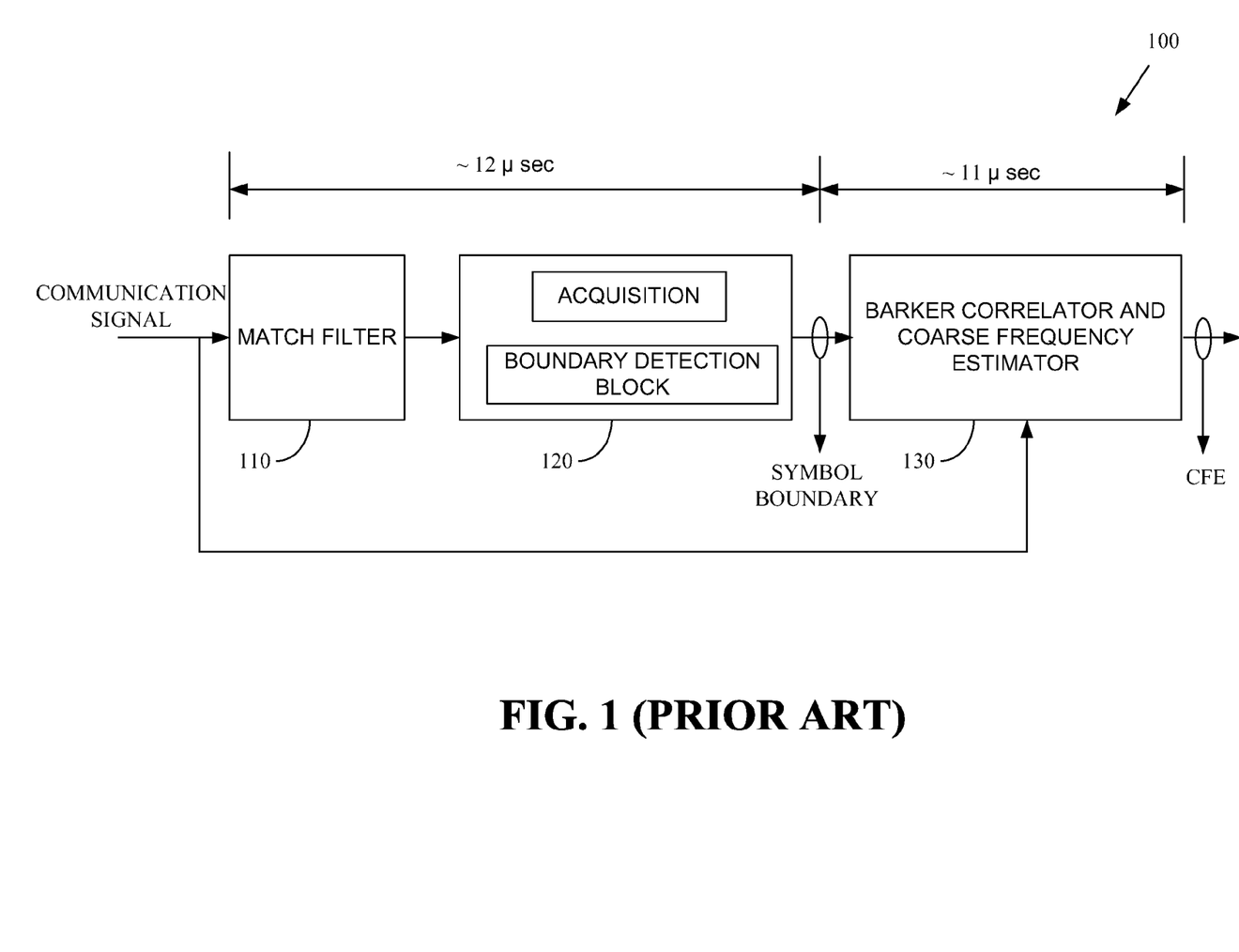
FIG. 1 shows a block diagram of a typical device for frame synchronization and CFE estimation.

FIG. 1 shows a typical block diagram 100 for acquisition and boundary detection and coarse frequency estimation. The received signal is passed through a matched filter 110 where a sliding Barker correlation is performed on the received signal. An acquisition and boundary detection block 120 determines the presence of valid packet and the symbol boundary using the output of matched filter. A Barker correlator block 130 begins the correlation at the detected symbol boundary. The Barker correlator block 130 output is used to compute the coarse frequency error.

Various steps performed during the training period according to the standards 802.11a and 802.11b have been discussed independently in literature. In this context, reference may be had to the publication of Nov. 18, 2003 titled "Improving Efficiency When Detecting WLAN Preambles," authored by Richard Williams, and published in Communications Design. Other publications which may be referred to include: Timothy M. Schmidle and Donald C. Cox, Robust Frequency and Timing Synchronization for OFDM, IEEE Transactions on Communications, Vol. 45, No. 12, December 1997; and J. Heiskala and J. Terry, OFDM Wireless LANs: A Theoretical and Practical Guide, SAMS Publishing, 2002.

SUMMARY OF THE INVENTION

According to an aspect of the present subject matter a method is provided. The method may include the step of receiving a communication signal in a matched filter. The matched filter may be configured for selecting one or more blocks from the communication signal. The matched filter may be further configured for filtering the blocks to obtain an output of the matched filter. The method may also include the step of providing the output of the matched filter to a frame synchronizer and to a coarse frequency estimator. The method may include the step of obtaining substantially simultaneously a symbol boundary using the frame synchronizer and a plurality of metrics using the coarse frequency estimator. Each of the metric may be an indicative of an estimate of coarse frequency offset. The method may further include a step of selecting one of the metrics from the plurality of metrics according to the symbol boundary for obtaining an estimate of the coarse frequency offset. The method further provides a step of obtaining the estimate of the coarse frequency offset by performing an inverse tangent operation on the selected metric.

According to another aspect of the present subject matter a device is provided. The device may include a matched filter, which may be configured for receiving a communication signal. The matched filter may be configured for selecting one or more blocks of the communication signal. The matched filter may further be configured for filtering the blocks to obtain an output of the matched filter. The device may include a frame synchronizer coupled to the output of the matched filter. The frame synchronizer may be configured for providing a symbol boundary. The device may further include a coarse frequency estimator coupled to the output of the matched filter. The coarse frequency estimator may be configured for selecting a metric amongst a plurality of metrics according to the symbol boundary. Each of the metrics may be an indicative of an estimate of coarse frequency. The frame synchronizer and the coarse frequency estimator may be configured to provide substantially simultaneously the symbol boundary and the plurality of metrics respectively. The device may be further configured to estimate the coarse frequency offset by performing an inverse tangent operation on the selected metric.

According to an aspect an article is taught. The article includes above device.

According to a further aspect of the present subject matter a computer readable medium is provided. The computer readable medium may be operable with a computer system. The computer-readable medium may have stored thereon instructions operable with an architectural simulator environment supported by the computer system. The computer readable medium includes instructions for executing the above method.

According to yet another aspect of the present subject matter another article is taught. The article includes the computer readable medium.

DETAILED DESCRIPTION OF DRAWINGS

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 2:
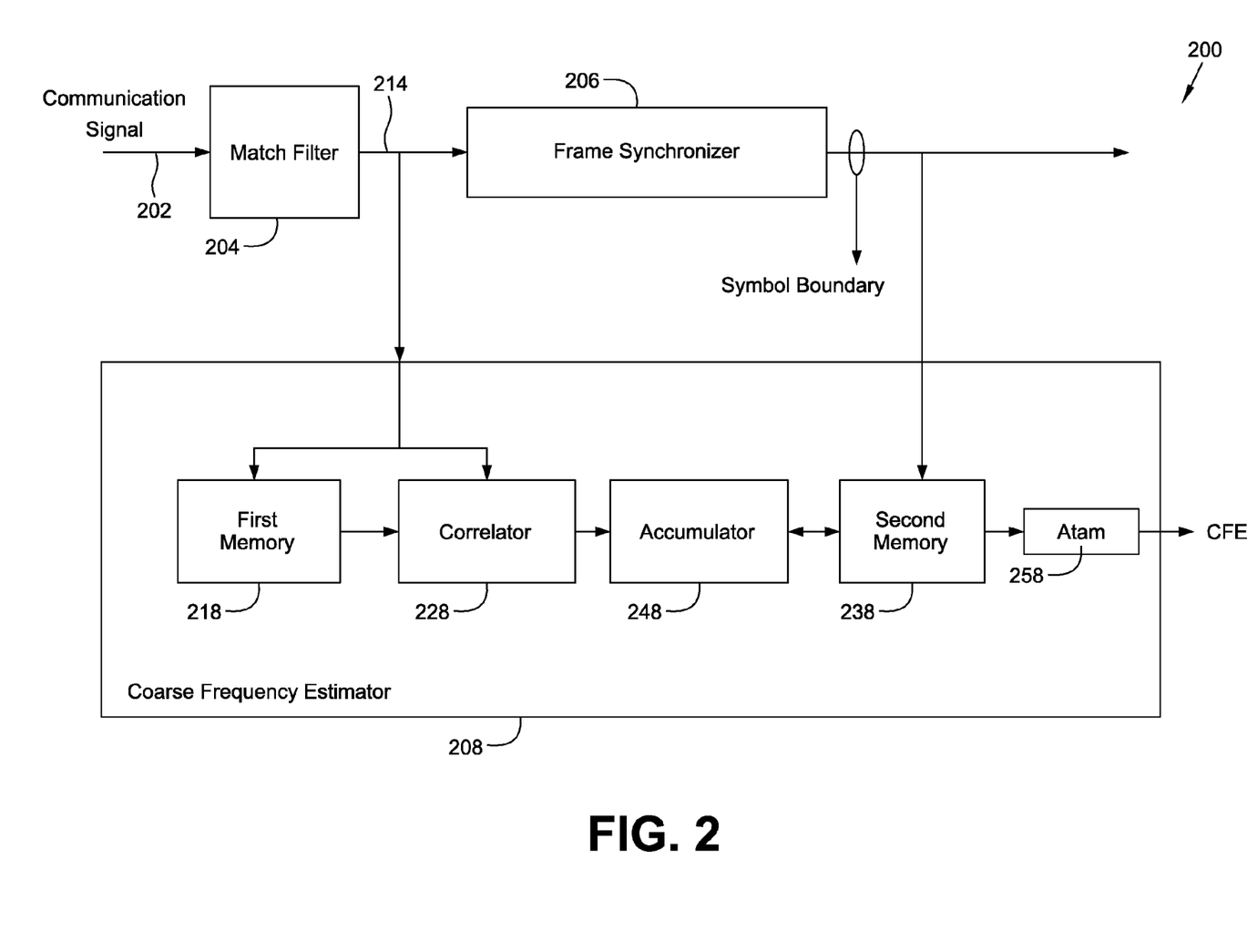
FIG. 2 shows a block diagram of a device for frame synchronization and CFE estimation in accordance with the present invention.

FIG. 2 shows a device 200 according to present invention. The device 200 includes a matched filter 204. The matched filter 204 receives a communication signal at its input 202. The communication signal is a signal received by the device 200 via a wireless communication system. The communication signal may have one or more frames. The frame includes a number of symbols. The matched filter 204 may be a Finite Impulse Response filter (FIR). The matched filter is configured for selecting one or more blocks of the communication signal. Each of the blocks may include a number of samples. A collection of samples may represent a symbol. A block may include one or more symbols. The matched filter 204 is configured for selecting blocks such that number of samples in a block is equal to number of elements of a Pseudo Noise (PN) sequence. The PN sequence may be a Barker sequence. The Barker sequence may be an upsampled Barker sequence. The upsampled Barker sequence referred to a Barker sequence that has been upsampled. Usually a Barker sequence contains 11 chips however for obtaining better accuracy the upsampled Barker sequence may be used. The upsampled Barker sequence may have 22 or 44 or higher number of samples. The matched filter 204 filters the received communication signal and provides an output 214. The filtering may be performed according to a sliding correlation operation of the communication signal, with a time reversed Barker sequence.

According to one possibility, for a PN sequence of length N represented as $b_n$ the matched filter 204 may be modeled for filtering the incoming samples $x_n$ of a block of the communication signal as follows.

$$y_k = \sum_{n=0}^{N-1} x_{(k+n)} b_n \quad (1)$$

Where, $y_k$, is the output of the matched filter 204 and $x_k$ is $k^{th}$ sample of the block, and $b_n$ is $n^{th}$ element of the PN sequence. Numeral N is the length of the PN sequence. In a typical Barker sequence N is equal to 11. The matched filter 204 may be made to operate at a chip rate of the PN sequence or at a rate higher than the chip rate of the PN sequence. According to one example, when the PN sequence is the Barker sequence, the matched filter 204 may be made to operate twice faster than the chip rate of the Barker sequence. Operating the matched filter 204 at higher rate than the chip rate of the PN sequence improves the correlation accuracy.

The device 200 further includes a frame synchronizer 206 and a coarse frequency estimator 208 both coupled to the output of the matched filter 204. The frame synchronizer 206 may be configured to provide the symbol boundary. The operation of the frame synchronizer 206 is being explained with reference to an example in which a reference is made to the Barker sequence as the PN sequence. A person skilled in the art will appreciate that the frame synchronizer 206 may be explained on the same lines as described with reference to following example, for other than the Barker sequence, with appropriate substitutions, any such embodiment will be within the scope of this invention.

The frame synchronizer 206 processes the output of the matched filter in blocks of 22 samples when, for example, when the incoming communication signal is received at a sample rate of 22 MHz. In this case the upsampled Barker sequence may have 22 elements, which is equal to the number of samples of the communication signal received in one microsecond. The magnitude of the output of the matched filter 204 is compared in the frame synchronizer 206 with a predetermined threshold. Due to the correlation properties of the Barker sequence, a peak magnitude value will be obtained when the samples are exactly aligned with the Barker sequence and lower magnitude values at other points. The maximum peak in each of the blocks is compared with the predetermined threshold. According to one possibility a receipt of a valid frame may be confirmed if 10 peaks in consecutive blocks exceed the predetermined threshold. The frame synchronizer 206 and a Coarse Frequency Estimator 208 are reset if the peak in a block does not exceed the threshold.

In the above process where the magnitude of the matched filter 204 output 214 is directly compared against the threshold, accuracy of the synchronized frame may depend on the AGC gain settings. This dependency may be subsidized by obtaining a normalized value of the matched filter output against the power of the samples used for obtaining the output of the matched filter 204. Since, the normalized value of the matched filter output 214 may cancel the effect of AGC gain and therefore an optimum threshold can be set according to the frame detection probability, which may be independent of the AGC gain. The frame synchronizer 206 is configured for computing a power value that corresponds to the power of the samples used for obtaining the output 214 of the matched filter 204. The matched filter output 214 may be normalized using the power value to obtain the normalized value of the matched filter output 214. The power value may be computed according to what follows below.

$$p_k = \sum_{n=0}^{N-1} x_{(k+n)} x^*_{(k+n)} \qquad (2)$$

where, $p_k$ is the power of the incoming samples and $x_k$ is the $k^{th}$ sample and $x^*_k$ is the complex conjugate of the $k^{th}$ sample.

The frame synchronizer 206 processes the output of the matched filter 204 in blocks of 22 samples, which is, equal to the length of the Barker sequence upsampled by 2. In order to make the acquisition more robust, apart from the check of the peak magnitude exceeding the predetermined threshold, periodicity check may also be performed. For a valid frame, it is expected that the peaks are repeated periodically. According to one example, for upsampled Barker sequence the peak is expected to repeat once in 1 microsecond (22 samples). For this purpose, a counter of length equal to the upsampled Barker code (22 samples), is maintained to keep track of the position of the peak exceeding the threshold. If the number tracked in the counter indicates that number of samples exceeding the threshold corresponds to a number that is expected in a valid frame (4, in this case), then receipt of a valid frame is confirmed. The frame synchronizer 206 and the coarse frequency estimator 208 are reset if no correlation in a block exceeds the threshold or the number tracked in the counter array does not correspond to the number that may be expected in the valid frame. The results obtained from the frame synchronizer are enlisted in TABLE 1.

TABLE 1

Packet Detection Performance

| Condition | Result |
|---|---|
| Noise | False alarm rate = ~0.6% |
| AWGN @ −4.4 dB, with 50 ppm offsets | Probability of detection = ~100% |
| 450 ns channel @ 7 dB, with 50 ppm offsets | Probability of detection = ~98.6% |

For this example, the threshold of 1.2 is found to be optimum for the relative correlation peak and a value of 4 for the threshold count.

In 802.11b systems, the communication signal may have a frame that either has a long preamble (having 128 symbols) or a short preamble (having 56 symbols). The detection of the short preamble sequence imposes stricter restrictions on the acquisition time and hence this worse condition is considered for analysis.

Further setting of the threshold may be dynamically set according to periodicity of the output of the matched filter 204, which may be a characteristic of the output obtained by filtering the communication signal according to the Barker sequence. Such periodicity is less probable in case of any noise or the communication signal which is not meant for the device 200. The frame synchronizer 206 is further configured for obtaining a symbol boundary in the frame by accumulating the magnitudes of the filtered samples in consecutive blocks and finding the maximum value. The accumulation is performed so that for any two given blocks, the magnitude of the first sample of a block is accumulated with the first sample of the subsequent block. The highest amongst the accumulated values is identified as the symbol boundary by the frame synchronizer 206.

In due course of communication it is likely that the transmitters and receivers have an operating frequency mismatch due to difference between the clocks used by these systems. To correct this offset, coarse frequency error may be computed. The offset frequency may be estimated during the preamble of the frame. This estimation may be performed once for each frame. A carrier phase offset tracking mechanism that follows coarse carrier frequency offset estimation may be designed to track variations of ~+/−5 ppm and therefore, it is desirable to limit the frequency offset after coarse carrier frequency offset estimation to +/−5 ppm. The maximum allowed frequency offset is ±50 ppm according to the IEEE specifications.

The coarse frequency estimator 208 is configured for selecting a metric amongst the plurality of metrics according to the symbol boundary obtained by the frame synchronizer 206. Each of the metric is indicative of an estimated coarse frequency offset. The frame synchronizer 206 and the coarse frequency estimator 208 are configured to provide substantially simultaneously the symbol boundary and the plurality of metrics respectively. While the frame synchronizer 206 is busy in confirming receipt of the valid frame and obtaining the symbol boundary, the coarse frequency estimator 208 obtains the metrics. The coarse frequency estimator 208 receives the output of the matched filter 204 in a first memory 218 and in a correlator 228. Outputs of the correlator 228 are accumulated in a second memory 238 via an accumulator 248. The correlator 228 obtains a metric by performing a sliding correlation. The sliding correlation is performed on a first sample which is obtained from the first memory 218 and a second sample which is obtained from the output of the matched filter 204. The first and the second samples are temporally separated from one another by a predetermined time, The predetermined time is equal to the time length of the PN sequence used for obtaining the output of the matched filter 214. In the present example the predetermined time may be 1 microsecond, which provides 22 samples at 22 MHz. The metrics are stored in the second memory 238. Once the metrics are obtained for the Barker sequence length and are stored in the second memory, the subsequent metrics obtained are accumulated in the second memory 238. The accumulator 248 is configured for enabling accumulation of the first metric of a block with the first metric of the subsequent block and so on and storing the accumulated metric in the second memory 238. The metric corresponding to the symbol boundary obtained by the frame synchronizer 206 can be selected and the coarse frequency offset may be computed according to the selected metric.

The computation of the frequency offset may be carried out by the Atan block 258 as follows:

The coarse estimate of the frequency offset, $\Delta f$, is obtained as:

$$\Delta f = \frac{1}{2\pi T_s}\tan^{-1}\left(\frac{imag(C_G)}{real(C_G)}\right) \qquad (3)$$

Where, $T_s$ is the duration of a Barker sequence ($T_s$=1 μs) and $C_G$ is the correlation between the Barker correlation of two consecutive symbols. $C_G$ may be computed as:

$$C_G = \sum_{i=0}^{P} BC_i BC_{i+1}^* \quad (4)$$

Where, P is the number of symbols used for averaging which is 10 in above example, $BC_i$ is the Barker correlation of the symbols used for averaging, and $BC^*_i$ is complex conjugate of $BC_i$.

Both the coarse frequency estimator 208 and the frame synchronizer 206 use the same input, i.e., the output of the matched filter 204. The matched filter 204 filters the signal with the barker sequence which is nothing but the sliding correlation of the input signal with the Barker sequence. From equation (4) for coarse frequency offset estimation, it is required to obtain a correlation value of the barker correlated values of 2 consecutive symbols. When coarse frequency offset estimation is executed in parallel with the frame synchronization, since the symbol boundary may not be known at that time, one of the possible implementations is to store all the 22 correlation values over 10 symbols, i.e., a total of 220 values. Once the boundary is estimated then the 10 values corresponding to the symbol boundary can be correlated and averaged for the offset estimation. This may require a memory to store the 220 correlation values, both in phase and quadrature phase. Further this device provides performing of the correlation between the 10 barker correlation values in a pipelined manner, which offers advantage in terms of time saving. For the device the data flow may be explained as follows: In this device, the incoming I (real quotient of the sample) and Q (imaginary quotient of the sample) samples are multiplied with the conjugate of samples stored in memory the first memory corresponding to a sample index. The sample index is used to index a location of a sample in a block. The memory is initialized with zero so that the first 22 samples I+jQ are multiplied with zero and then with the appropriate value of complex conjugate. The product of the complex multiplication is added to the value in the accumulator 248 and stored in the second memory corresponding to the sample index. When the symbol boundary is detected by the frame synchronizer 204, then the value stored in the second memory corresponding to the location indicated by the symbol boundary is selected to be supplied to the Atan block 258. At the Atan block 258 inverse tangent of the supplied value is computed to obtain coarse frequency offset value. According to this example, only 2 memories of depth 22 are required. The correlation value of the barker correlation at the symbol boundary is available when the symbol boundary value is determined. Therefore offers a substantial time saving in terms of computation. According to one example, the total time required for frame synchronization and CFE may as low as 13 or 14 microseconds as against 21 microseconds which may be required by a typical conventional method.

Figure 3:
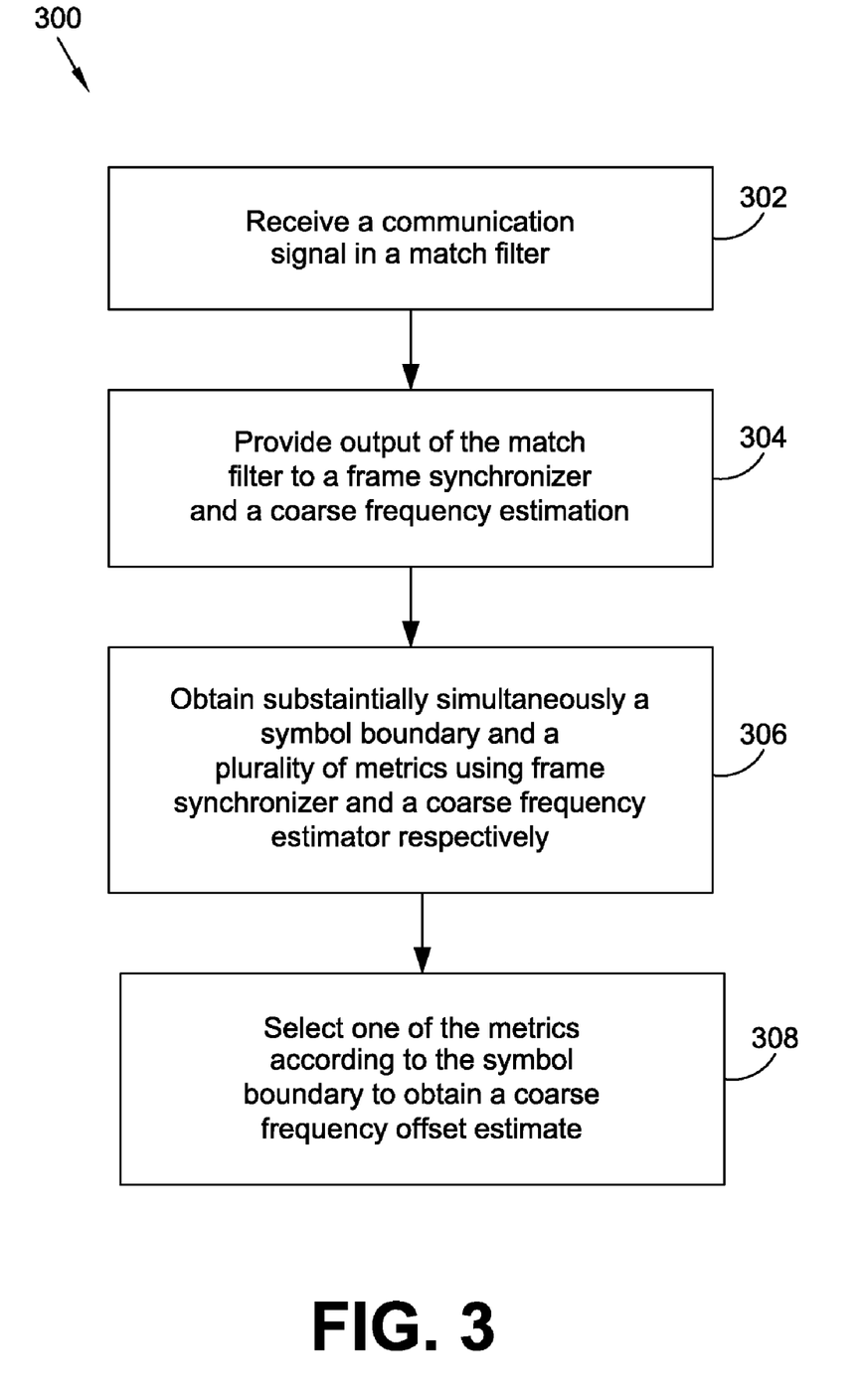
FIG. 3 shows a method in accordance with the present invention.

The present discussion further provides a method 300 for frame synchronization and coarse frequency offset estimation for a communication signal shown in FIG. 3. At a step 302 the communication signal is received in a matched filter. The communication signal may be encoded according to 802.11 standards and accordingly may include at least a frame. The frame may have a number of symbols. At a step 304 output of the matched filter is provided to a frame synchronizer and a coarse frequency estimator. At a step 306 the symbol boundary and a plurality of metrics are obtained substantially simultaneously using the frame synchronizer and coarse frequency estimator respectively. Each of the metric is an indicative of an estimate of the coarse frequency offset. At a step 308 one of the metrics is selected according to the detected symbol boundary.

Figure 3A:
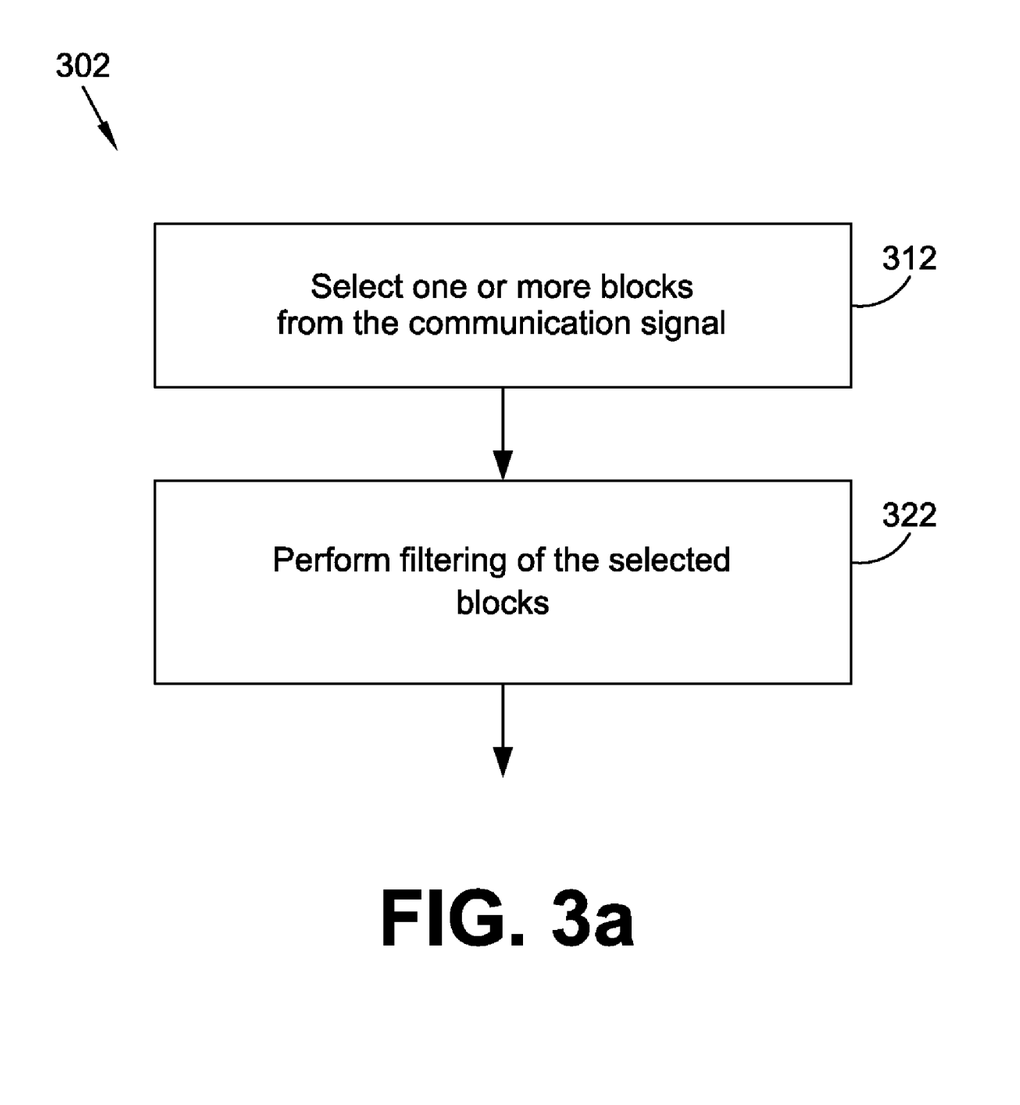
FIG. 3a, 3b and 3c show the method of FIG. 3 in more detail in accordance with present invention.

FIG. 3a shows the step 302 in more detail. At a step 312 one or more blocks of the communication signal are selected. The block may have a number of samples. At a step 322 filtering of the samples of the selected block may be performed. Number of samples in a block may be equal to number of elements in a Pseudo Noise (PN) sequence. The PN sequence may be a Barker sequence.

Figure 3B:
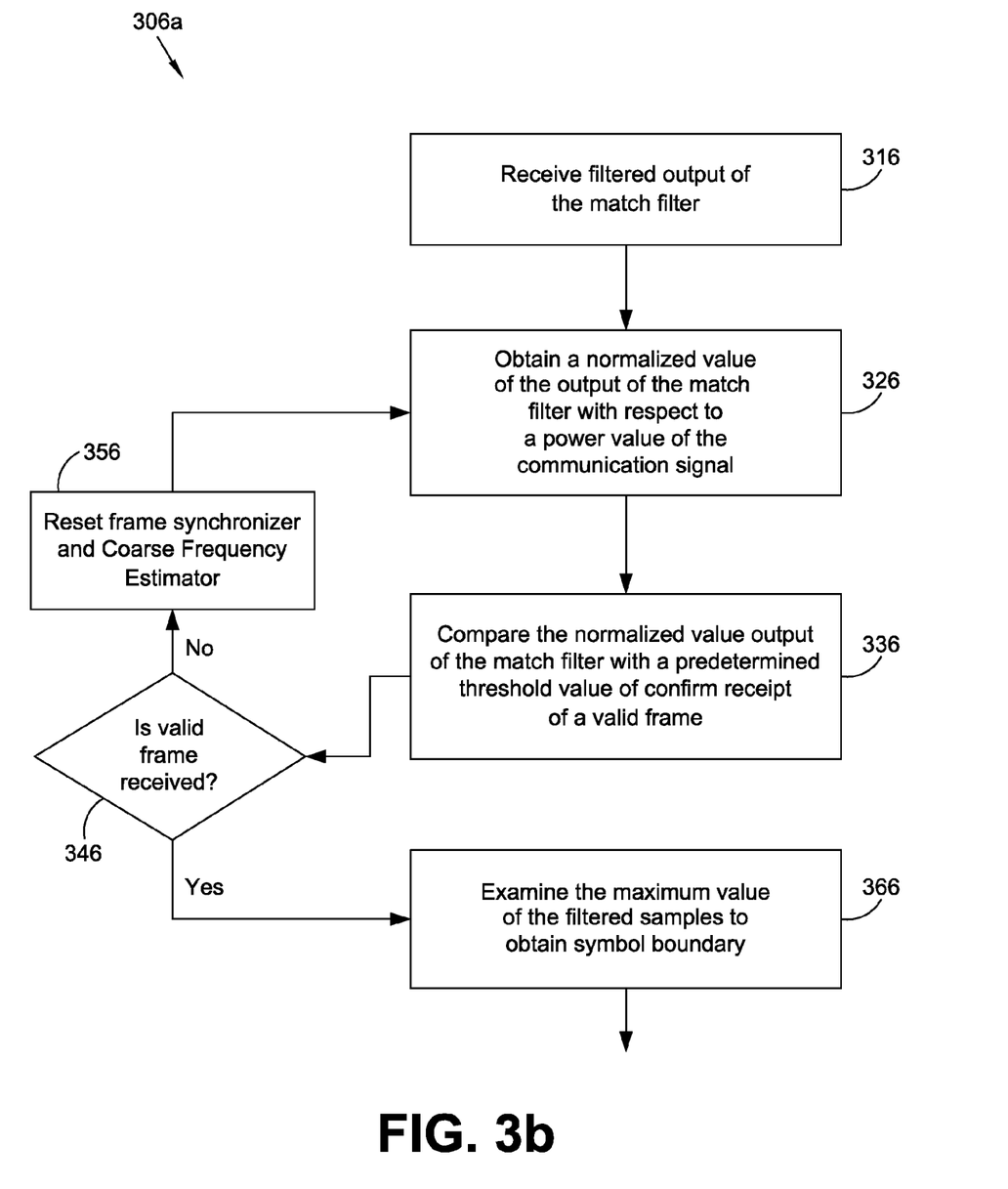

FIG. 3b shows a first part 306a of the step 306 in more detail. According to the first part 306a at a step 316 output of the matched filter is received. At this step a power value of the samples used for filtering may also be computed. This step provides an output of the matched filter that includes the power value and the filtered signal. At a step 326 a normalized magnitude value of the filtered signal with respect to the power value is obtained. At a step 336 the normalized value of each of the filtered samples is compared with a predetermined threshold and once 10 consecutive peaks exceed the threshold and/or a periodicity check is performed to confirm receipt of a valid frame. At step 346 it is checked if a valid frame has been received. If the valid frame has not been received then the frame synchronizer is reset at a step 356 and the control is transferred to the step 326. If at step 346 it may be confirmed that the valid frame is received then filtered samples of the block are examined for a maximum value to obtain the symbol boundary.

Figure 3C:
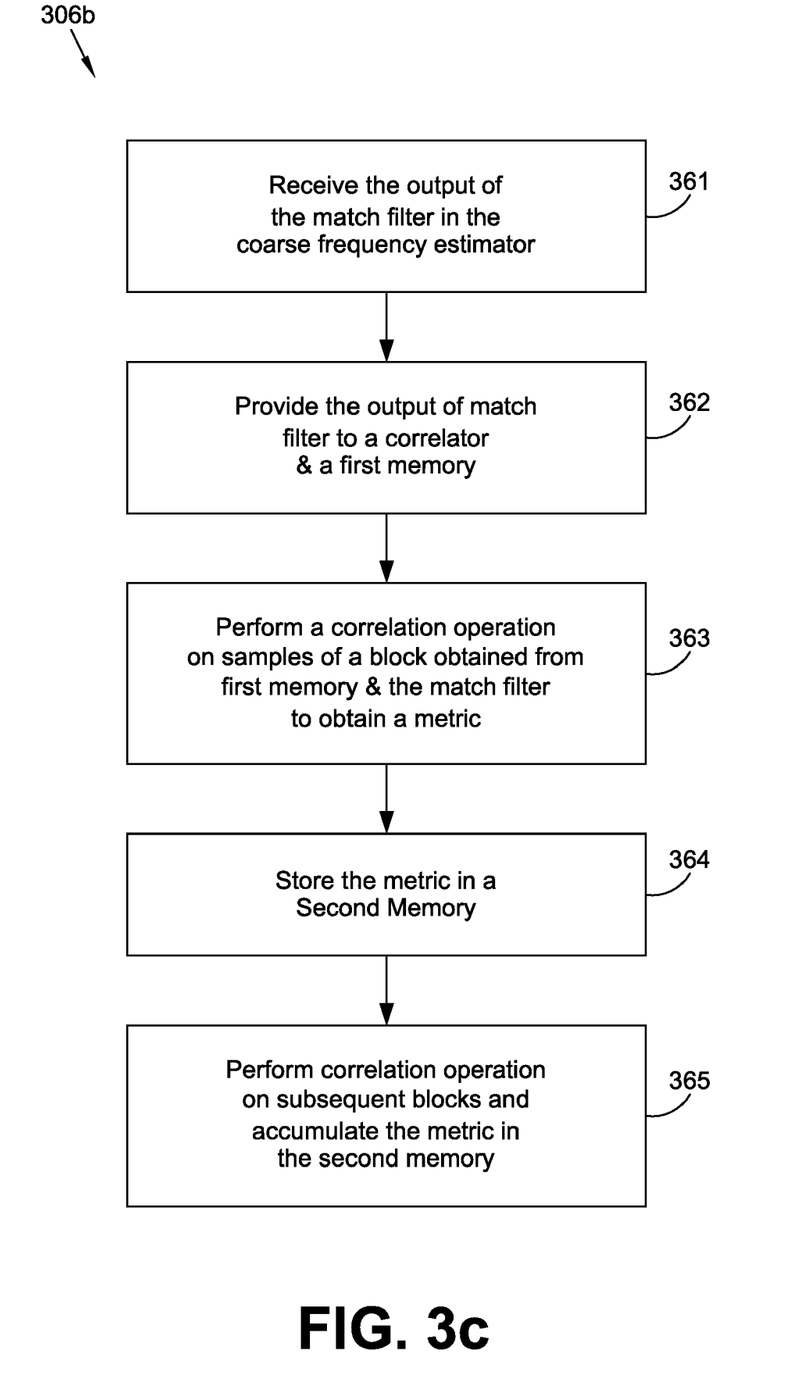

FIG. 3c shows a second part 306b of the step 306. According to the second part 306b at a step 361 the output of the matched filter is received in the coarse frequency estimator. At a step 362 the matched filter output is provided to a correlator and a first memory. At a step 363 a correlation operation is performed by the correlator on samples of the block. The samples are obtained from the first memory and the matched filter. This step obtains a metric which is an indicative of an estimate of a coarse frequency offset. The metric is obtained by performing a sliding correlation in the correlator on a first sample obtained from the first memory and a second sample obtained from the output of the matched filter. The first and the second samples being temporally separated from one another by a predetermined time. The predetermined time is equal to the time length of the PN sequence used for obtaining the output of the matched filter 214. In the present example, the predetermined time may be 1 microsecond, which provides 22 samples at 22 MHz. At a step 364 the metric is stored in a second memory. The steps 363 and 364 are performed for all the samples in the block. At the step 365 the correlation operation is performed for subsequent blocks and the metrics obtained by performing correlation operation are accumulated in the second memory. The step of accumulating the metric includes the step of accumulating the first metric of the block with the first metric of the subsequent block and so on for the subsequent metrics of the blocks.

The symbol boundary obtained at the step 366 may be supplied to the second memory to select the metric that corresponds to the desired estimate of coarse frequency offset. The selected metric may be used for computing an inverse tangent which is the desired estimate of coarse frequency offset.

Although above description includes various steps that appears to be arranged serially in the exemplary embodiments, other embodiments of the subject matter may execute two or more steps in parallel, using multiple processors or a single processor organized as two or more virtual machines or sub-processors.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The methods described-above with respect to the method can be performed in a different order from those shown and described herein.

FIGS. 1-3c herewith are merely representational and are not drawn to scale. Certain proportions thereof may be exaggerated, while others may be minimized. All the figures illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, invention lies in less than all features of a single disclosed embodiment. Thus the following claims are hereby incorporated into the detailed description of the embodiments of the invention, with each claim standing on its own as a separate preferred embodiment.

The invention claimed is:

1. A method comprising the steps of:
receiving a communication signal in a matched filter, the matched filter being configured for selecting one or more blocks from the communication signal and for filtering the blocks to obtain an output of the matched filter;
providing the output of the matched filter to a frame synchronizer and to a coarse frequency estimator;
obtaining substantially simultaneously a symbol boundary using the frame synchronizer and a plurality of metrics using the coarse frequency estimator, wherein each of the metric being indicative of an estimate of coarse frequency offset, wherein obtaining the plurality of metrics comprises:
receiving output of the matched filter in a first memory and in a correlator;
obtaining a metric by performing a sliding correlation using the correlator on a first sample obtained from the first memory and a second sample obtained from the output of the matched filter, the first and the second samples being separated from one another by a predetermined time;
storing the metric in a second memory;
repeating above steps for each of the samples of a block; and
executing the step of receiving the samples of a following block, and obtaining the metric;
accumulating the obtained metric in the second memory; and
repeating the steps of executing and accumulating for a number of subsequent blocks; and
selecting one of the accumulated metric from the plurality of metrics corresponding to a location indicated by the symbol boundary for obtaining an estimate of the coarse frequency offset.

2. The method as claimed in claim 1, wherein the method further comprises a step of obtaining the estimate of the coarse frequency offset by performing an inverse tangent operation on the selected metric.

3. The method as claimed in claim 1, wherein the block may include a plurality of samples.

4. The method as claimed in claim 1, wherein the matched filter being configured for selecting one or more blocks such that number of samples in a block is equal to the number of elements in a Pseudo Noise (PN) sequence.

5. The method as claimed in claim 4, wherein the output of the match filter is obtained by performing a sliding correlation operation of the communication signal, with a time reversed PN sequence, wherein the PN sequence is a Barker sequence, and wherein the output of the matched filter is obtained using the equation:

$$y_k = \sum_{n=0}^{N-1} x_{(k+n)} b_n$$

wherein, $y_k$ is the output of the matched filter, $x_k$ is $k^{th}$ sample of the block, $b_n$ is $n_{th}$ element of the PN sequence and N is the length of the PN sequence.

6. The method as claimed in claim 5, wherein the Barker sequence is an upsampled Barker sequence.

7. The method as claimed in claim 1, wherein the step of obtaining symbol boundary includes a step of obtaining a power value corresponding to power of the communication signal.

8. The method as claimed in claim 7, wherein the step of obtaining the power value may include step of obtaining power value of samples used for obtaining output of the matched filter.

9. The method as claimed in claim 8, wherein the step of obtaining symbol boundary includes a step of confirming receipt of a valid frame by comparing the magnitude of output of matched filter with a predetermined threshold value.

10. The method as claimed in claim 9, wherein the step of confirming includes a step of obtaining a normalized value of the magnitude of output of the matched filter with respect to the power value and comparing the normalized value with the predetermined threshold value.

11. The method as claimed in claim 9, wherein the predetermined threshold is set according to a valid frame detection probability.

12. The method as claimed in claim 1, wherein the step of obtaining symbol boundary includes the step of confirming receipt of a valid frame by examining for periodicity of the samples having maximum value.

13. The method as claimed in claim 1, wherein the step of obtaining symbol boundary includes accumulating magnitudes of the filtered samples in consecutive blocks and finding a maximum value.

14. The method as claimed in claim 1, wherein the step of accumulating the metric includes the step of accumulating the first metric of a block with the first metric of the subsequent block and so on for the subsequent metrics of the blocks.

15. The method as claimed in claim 1, wherein the predetermined time is equal to time-length of the PN sequence.

16. The method as claimed in claim 1, wherein the number of subsequent blocks is 8.

17. A device comprising:
a matched filter being configured for receiving a communication signal, and for selecting one or more blocks of the communication signal, and for filtering the blocks to obtain an output of the matched filter;
a frame synchronizer coupled to the output of the matched filter, wherein the frame synchronizer being configured for obtaining a symbol boundary; and
a coarse frequency estimator coupled to the output of the matched filter, wherein the coarse frequency estimator being configured for obtaining a plurality of metrics, wherein each of the metric being indicative of an estimate of coarse frequency offset, wherein the frame synchronizer and the coarse frequency estimator are configured to obtain substantially simultaneously the symbol boundary and the plurality of metrics respectively, and wherein the coarse frequency estimator comprises:
a first memory for receiving the output of the matched filter;
a correlator for receiving output of the first memory and the matched filter, the correlator is configured for obtaining a metric by performing a sliding correlation on a first sample obtained from the first memory and a second sample obtained from the output of the matched filter, the first and the second samples being temporally separated from one another by a predetermined time; and
a second memory receiving output from the correlator for storing the metric,
wherein the coarse frequency estimator repeats above steps for each of the samples of a block, executes the step of receiving the samples of a following block, obtains the metric, accumulates the obtained metric in the second memory, and wherein the coarse frequency estimator repeats the steps of executing and accumulating for a number of subsequent blocks, and
wherein the coarse frequency estimator being configured for selecting an accumulated metric amongst the plurality of metrics corresponding to a location indicated by the symbol boundary for obtaining an estimate of the coarse frequency offset.

18. The device as claimed in claim 17, wherein the device is further configured for obtaining the estimate of the coarse frequency offset by performing an inverse tangent operation on the selected metric.

19. The device as claimed in claim 17, wherein the matched filter is configured for selecting the blocks such that number of samples in a block is equal to the number of elements in a Pseudo Noise (PN) sequence, and wherein the block includes a plurality of samples.

20. The device as claimed in claim 19, wherein the output of the match filter is obtained by performing a sliding correlation operation of the communication signal, with a time reversed PN sequence, wherein the PN sequence is a Barker sequence, and wherein the output of the matched filter is obtained using the equation:

$$y_k = \sum_{n=0}^{N-1} x_{(k+n)} b_n$$

wherein, $y_k$ is the output of the matched filter, $x_k$ is $k^{th}$ sample of the block, $b_n$ is $n_{th}$ element of the PN sequence and N is the length of the PN sequence.

21. The device as claimed in claim 20, wherein the Barker sequence is an upsampled Barker sequence.

22. The device as claimed in claim 17, wherein the frame synchronizer is configured for obtaining a power value corresponding to power of the samples used for obtaining output of the matched filter.

23. The device as claimed in claim 22, wherein the frame synchronizer is configured for confirming receipt of a valid frame by comparing the magnitude of output of matched filter with a predetermined threshold.

24. The device as claimed in claim 23, wherein the frame synchronizer is configured for confirming receipt of the valid frame by obtaining a normalized value of the magnitude of output of the matched filter with respect to the power value and comparing the normalized value with the predetermined threshold.

25. The device as claimed in claim 23, wherein the predetermined threshold is set according to a valid frame detection probability.

26. The device as claimed in claim 17, wherein the frame synchronizer is configured for obtaining symbol boundary in the frame by accumulating magnitudes of the filtered samples in consecutive blocks and finding a maximum value.

27. The device as claimed in claim 17, wherein the frame synchronizer is configured for confirming receipt of a valid frame by examining for periodicity of the samples having maximum value.

28. The device as claimed in claim 17, wherein the correlator is configured for enabling accumulation of the first metric of a block with the first metric of the subsequent block and so on for the subsequent metrics of the blocks.

29. An article comprising the device of the claim 17.

30. A non-transitory computer readable storage medium operable with a computer system, the computer-readable medium having stored thereon instructions operable with an architectural simulator environment supported by the computer system, the medium comprising instructions that, when executed by the computer system, cause the computer system to perform the method of the claim 1.

31. An article comprising the computer readable medium of the claim 30.

32. The method of claim 1, wherein obtaining the symbol boundary using the frame synchronizer comprises:
processing the one or more blocks from the matched filter;
comparing a peak sample value in each of the blocks with a predetermined threshold;
declaring that there is a valid frame detected when a certain number of the peak values in consecutive blocks exceed the predetermined threshold and the peak values are repeated periodically;
accumulating magnitudes of the filtered samples at each corresponding position in consecutive blocks in the valid frame; and
identifying a maximum value from the accumulated values as the symbol boundary.

* * * * *